United States Patent Office 3,562,115
Patented Feb. 9, 1971

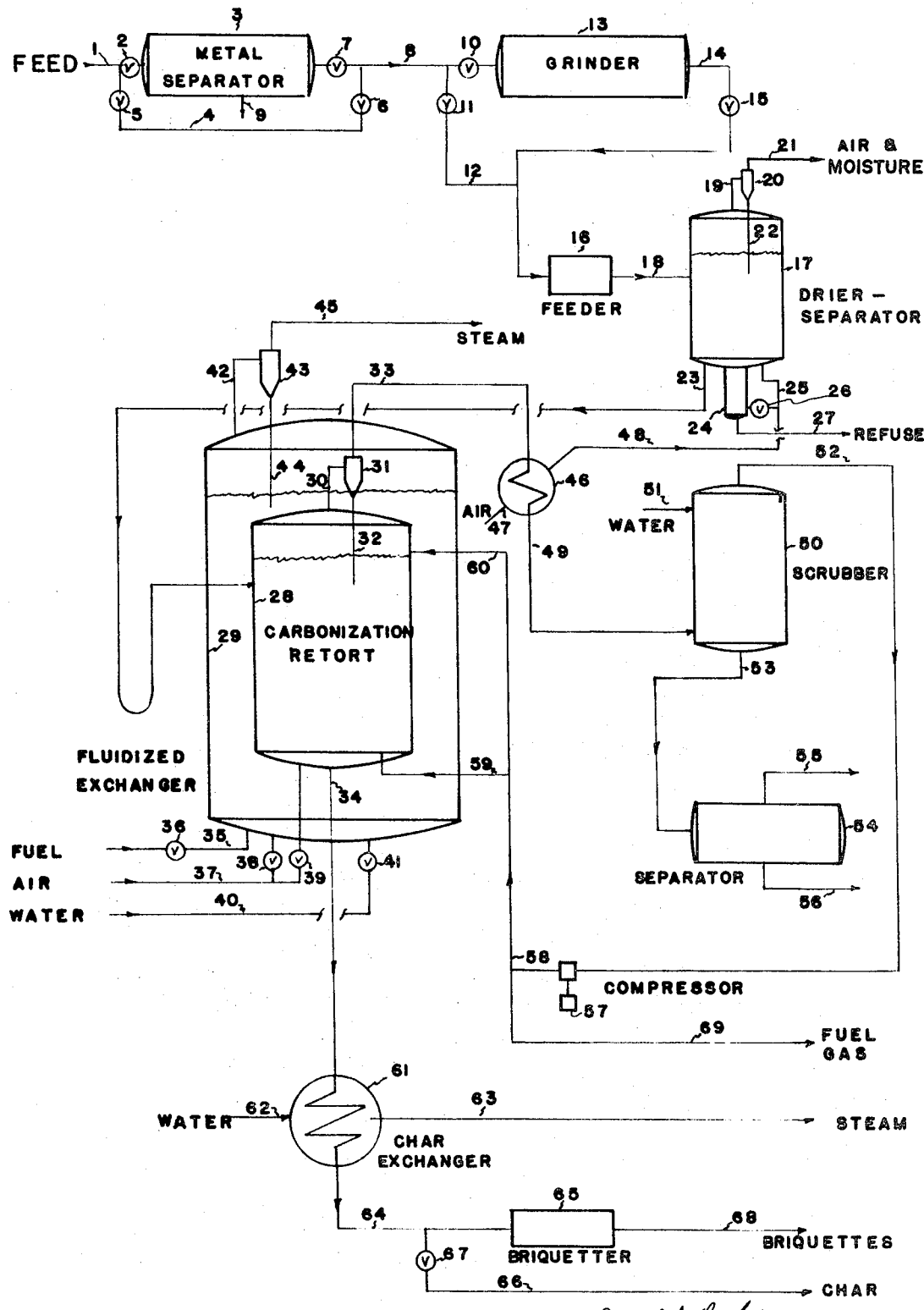

3,562,115
FLUIDIZED BED RETORT SURROUNDED BY A FLUIDIZED SAND HEAT EXCHANGER
Donald D. Dunlop, Norman, Okla., assignor to Creative Enterprises International, Norman, Okla., a corporation of Oklahoma
Continuation of application Ser. No. 461,916, June 7, 1965. This application Jan. 30, 1969, Ser. No. 800,806
Int. Cl. C10b 3/02
U.S. Cl. 201—1                                          13 Claims

ABSTRACT OF THE DISCLOSURE

This invention relates to a method for the conversion of organic material to carbon with the evolution of a combustible gas in a fluidized bed surrounded by a fluidized heat exchanger.

---

This application is a continuation of patent application Ser. No. 461,916, filed June 7, 1965 and now abandoned.

An object of this invention is to provide an economical means of carbonizing a wide variety of organic materials. Such materials would include garbage, rubbish, sawdust, paper, wood, agricultural grain hulls, peat, coal, oil shale, and like materials.

Another object of this invention is to provide an economical means of carbonizing said organic materials in a continuous manner with a further object of recovering char, combustible gases, liquid organic chemicals, and steam.

These and other objects stated herein are accomplished by means of three principal sets of equipment as follows: (1) a fuel preparation section consisting of a grinder, metal and other undesirable solids separating facilities and a feed drier, (2) a retorting section comprised of a fluidized retorting vessel with the necessary heating and cooling equipment, and (3) a product separation and finishing section consisting of a gas scrubber to condense and remove liquid chemicals produced, a separations system for these chemicals and a briquetting machine to produce briquettes from the char produced.

Carbonization of various materials, for example, sawdust, has long been studied and proposals have been made for said carbonization in a wide variety of complicated mechanical apparatus. A further object of this invention is to carry out such carbonization in a very simple type of apparatus.

Earlier efforts to carbonize various organic materials have attempted to use counter current gas-solids heat exchange in order to heat the carbonization feed stock to carbonization temperatures. These efforts resulted in carbonizer temperature gradients of about 1,000° F. and more. The result was that volatile chemicals removed from the carbonization feed which had reached carbonization temperatures were condensed on the carbonization feed which was still approaching carbonization temperatures in the apparatus. This large temperature gradient results in the condensation of the carbonization chemicals and causes them to be recycled within the apparatus. This recycling is undesirable in that chemical degradation occurs thereby minimizing the quantity and quality of the liquid chemicals produced. Accordingly, a further object of this invention is to effect the carbonization of organic materials in a manner which will avoid the undesirable effects of the aforementioned process.

The basic means of carbonization of organic material contemplated in this invention is the use of a fluidized bed. The basic concepts of the fluidization of solids have long been known but were first reduced to commercial practice in the early 1940's in the fluid catalytic cracking of petroleum hydrocarbons. Fluid catalytic cracking and a limited number of petroleum processes continue to constitute the major use of the fluidization technique.

In its simplest form, my invention comprises a fluidized carbonization retort contained within a fluidized heat exchanger. The purpose of the heat exchanger is to provide heat at the outset of operations to initiate the carbonization reaction. Once the carbonization reaction has been started, said reaction is exothermic and thus the fluidized heat exchanger is transferred to the service of removing heat from the carbonization retort.

The fluidized exchanger may be initially heated by the burning of natural gas or other appropriate fuels in the fluidized bed. The fluidized material in the heat exchange bed may be comprised of sand or other readily fluidizable solids of appropriate particle size, e.g. Tyler screen size, 10 mesh or finer. The fluidized heat exchanger may be converted to cooling service by simply discontinuing the addition of fuel and air and substituting the injection of water. Since most carbonization reactions occur at temperatures in excess of 212° F., the injected water will be readily vaporized and may be recovered as steam through a cyclone or other suitable gas-solids device.

The quantities of air and gas required for the initial heating of the fluidized exchanger would be controlled by conventional temperature-flow control instruments. The operation of the carbonization retort would be carried out as follows. The retort would initially be filled with either the material to be retorted, e.g. sawdust, or with any convenient solid char of a particle size which could readily be fluidized. Controlled quantities of air would be admitted to the fluidized carbonization retort and would oxidize a portion of the material to be retorted in order to supply the heat of reaction. Supplemental fluidization gas, if additional fluidization gas is required, would be recycle gas from the retorting operation, natural gas, or any other convenient source of non-oxidizing gases. Solid feed to the carbonization retort may be introduced by a screw conveyer, pressurized lock-hopper, or an external fluidized bed by means of a fluidized transfer line.

For carbonization feeds containing undesirably high concentrations of moisture or other undesirable volatile matter, said carbonization feed may be dried by a preheat step in a separate fluidized bed or other suitable heat exchange apparatus. The source of heat for said fluidized drier or other appropriate drier design may readily be obtained from the fluidized heat exchanger, the steam produced by the fluidized heat exchanger, the product gas from the carbonization retort, or from other convenient sources.

The advantages of a fluidized retort can readily be seen by those skilled in the fluidization art. For example, it has been determined that the effective thermal conductivity of a fluidized bed is in the league of 7,000 B.t.u./hr./sq. ft./° F. Accordingly, in a fluidized retort, the incoming feed is heated to the proper retorting temperature faster than by any other known technique. For carbonization feeds requiring inordinately long carbonization times, it may be necessary to baffle the fluidized carbonization retort. It is well known that mixing in fluidized beds is rigid. Thus for feeds requiring a high residence time, it may be necessary to reduce the mixing somewhat to prevent withdrawal of uncarbonized feed. The baffling of fluidization apparatus is well known in the art. For example, alternate disk and donut type baffles have been successfully used in commercial practice. Thus, the aforementioned object of carbonizing organic material rapidly to minimize the adsorption and recycling of liquid products of the carbonization reaction is more readily achieved in a fluidized bed.

The products of the carbonization retort are solid char and a high temperature gas stream containing condensable materials. The product char is withdrawn from the carbonization retort and transferred to storage, a briquetting operation, or to any other desired end-use. Heat economy may be increased by the cooling of this char in a suitable exchanger.

The product gas from the carbonization retort is separated from entrained solids in a cyclone or other suitable gas-solids separation apparatus. The product gas leaving the cyclone is then transferred to a scrubber unit wherein condensable materials are removed from the gas and wherein the gas is cooled to ambient temperatures. The art of scrubber design is well known and a conventional packed column may be used with water or other appropriate chemical solutions as the scrubber liquid. The scrubber effluent gas is then water saturated at ambient temperatures and is ready for compression, if necessary, prior to being used as a fuel or other desirable end-use. The liquid effluent from the scrubber containing the scrubber feed liquid, e.g. water, and the condensed chemicals are then fed to a chemicals separation unit. If the scrubber liquid is water, the separation of the water from the organic chemicals produced is ordinarily a simple gravity separation. Accordingly, any one of a number of conventional gravity settlers well known in the art may be used. Product chemicals from the separator may then require further separation by any one of a number of standard liquid separation techniques, such as, distillation and the like.

A better idea of the operation of my invention may be obtained from the following description as applied to FIG. 1. This figure shows the principal apparatus involved as well as a description of the function of each piece of apparatus.

The feed enters through line 1 and is passed through a magnetic separator 3.

Metallic materials are separated and discarded through line 9. For feed stocks not containing metals, valves 2 and 7 may be closed and valves 5 and 6 opened allowing the feed to bypass the metal separator via line 4. In any event, the materials are then transferred to the grinder via line 8.

This grinder may be a conventional Wood Hog or other shredding device in the case of paper, or other conventional grinding apparatus. In the case of a feed stock which does not require grinding, valves 10 and 15 may be closed and the feed diverted through line 12 by opening valve 11.

The feed is then transferred to Drier-Separator via feeder 16. Feeder 16 may be a conventional screw feeder, Star feeder, or other conventional solids feeding device. In the case of readily fluidized feeds, such as sawdust, feed may be introduced into Drier-Separator 17 through line 18 which may be a dense or disperse phase riser using air or other suitable carrier gases.

The principal function of Drier-Separator 17 is to remove excess moisture from the feed. This is accomplished in a fluidized drier utilizing air or other suitable fluidization gas heated in heater 46 or by other suitable heating means. The heating gas also serves to fluidize the Drier-Separator. Moisture removed from the feed is conveyed through line 19 to a cyclone 20 or other suitable gas-solids separation device. The solids from cyclone 20 are returned to the drier via dipleg 22 and the gas containing the moisture is removed through line 21. The drier would normally be operated above about 212° F. but below a temperature which would result in the removal of a significant amount of chemicals from the feed stock. A preferred operating temperature of the Drier-Separator is 212 to 400° F. It will be obvious to those skilled in the art that some of the heat leaving the drier via line 21 may be recovered by a suitable exchanger. The bottom of Drier-Separator 17 is equipped with a solids removal device 24. This device consists simply of an enlarged withdrawal section into which a portion of the drying gas is introduced via valve 26 from line 48. The volume of gas introduced into separator 24 shall be such that the fluidized feed shall not remain in separator 24, but the velocity shall be below that which would be adequate to fluidize rocks, non-magnetic metals not removed in metal separator 3, and the like. Said materials may be discarded through line 27.

The dried feed shall be transferred through line 23 by means of fluidization gas and shall be introduced into the carbonization retort 28 for retorting. Carbonization retort 28 is a fluidized bed of feed stock of a particle size small enough for fluidization with velocities below about 1½ feet per second superficial velocity. Carbonization retort 28 is enclosed by fluidized heat exchanger 29. Heat exchanger 29 shall be filled to the indicated level with sand or other readily fluidizable particulate solids and shall remove heat from the carbonization retort 28 during the carbonization reaction. A second function of fluidized exchanger 29 shall be for the purpose of heating the carbonization reactor 28 at the outset of operations. The heat necessary for heating fluidized exchanger 29 and carbonization retort 28 shall be supplied by natural gas or other combustible fuel via line 35 through valve 36. Air necessary for the combustion of the fuel introduced via line 35 shall be supplied through line 37 and valve 38. Once retorting temperature is reached, fuel and air normally fed through lines 35 and 37 shall be cut off and water or other desirable cooling liquids shall be introduced through line 40 and valve 41. The vaporization of the water so introduced shall serve to remove the heat of reaction from carbonization retort 28 and the steam produced thereby shall be removed from the fluidized exchanger 29 via line 42. Entrained solids removed with the steam shall be separated therefrom in cyclone 43 or other suitable gas-solids separation device; the solids removed therein shall be returned to the fluidization bed via dipleg 44 and the steam produced thereby shall be removed via line 45. Where operations in which the cooling requirements are insufficient to result in adequate fluidization of fluidized exchanger 29, supplement fluidization air or other desirable gas may be introduced via line 37.

The air requirements for the retorting reactions are introduced through lines 37 and valve 39 into carbonization retort 29. The effluent gases from carbonization retort 29 containing principally nitrogen and oxides of carbon along with vaporized chemicals from the retorting reaction are removed from carbonization retort 29 via line 30 to cyclone 31 or other suitable gas-solids separation device; the solids separated therein and returned to the carbonization retort via dipleg 32 and the effluent gas shall be removed via line 33 to scrubber 50 after passing through heat exchanger 46. The partially cooled retort product gases are introduced at the bottom of scrubber 50. Scrubber 50 may be a packed column scrubber, disk and donut scrubber, bubble tray scrubber, or other suitable gas-liquid contacting device. The scrubber liquid for most operations will be water although selective solvents may be required for particular feed stocks. Water or other scrubber liquids are introduced at the top of scrubber 50 via line 51. A distribution ring or grid may be required for the introduction of the scrubber liquid for large units on which liquid distribution may be a problem. The scrubbed gas from scrubber 50 is removed from the scrubber via line 52 to compressor 57. A portion of the compressor discharge may be required for introduction in the bottom of the fluidized retort to supply additional fluidization gas via line 59. In addition, a portion of the compressed discharge gas may be required for introduction into the dispersed phase of carbonization retort 28 via line 60 in order to minimize the residence time of the carbonization retort product gas. For some feed stocks, said gas may contain large quantities of olefins or other readily polymerizable gases which if allowed to remain in the disperse phase for an excessive period of time may result in carbonaceous deposits on the metal surface of carbonization retort 28. Introduction of scrubbed product gas would result in a reduction of the gas phase residence time and thereby minimize said carbon deposition.

Scrubber gas not required for the aforesaid problems shall be removed via line 69 as fuel gas. The principal combustion components of said gas will probably be methane and carbon monoxide.

The liquid phase effluent from scrubber 50 shall be removed via line 53 to separator 54. Separator 54 is a gravity separator wherein the less dense organic chemicals shall be removed from the top of separator 54 via line 55 for further separation may consist of distillation, or other conventional separation techniques. The water effluent from separator 54 shall be removed via line 56. For feed stocks producing water soluble chemicals, it may be necessary to subject the water effluent to a stripping operation in which said water soluble chemicals are separated from the bulk of the water from separator 54.

The solid carbonized organic material produced in carbonization retort 28 are removed via line 34 and transferred to a briquetting machine 65 or to a char storage area via line 66. The sensible heat of said char may be removed in exchanger 61 if desired and the steam produced therein may be removed via line 63. The briquetting machine 65 may be of a number of conventional briquetting machines the type of which is not critical to the use of this invention. If used, briquettes from briquetting machine 65 may be transferred to a packaging operation via conveyor 68.

In end-uses not involving briquetting, the char may be removed as a fluidized solid via line 66 and may be used in a furnace or other suitable end-use.

The temperature and pressure of the carbonization operation will vary widely depending upon the nature of the feed stock. In general, the carbonization reaction takes place between about 600° F. and 2,000° F. Inasmuch as carbonization in a fluid bed of the materials indicated has not been carried out, it is difficult to accurately specify desirable temperature ranges. The carbonization pressure is not considered a significant variable for most materials. For reasons of economics it is preferable to conduct these carbonization reactions at pressure of 100 p.s.i.g. or less. However, for materials in which higher carbonization pressure would be beneficial there are no theoretical reasons why my process may not be operated at higher carbonization pressures.

It will be obvious to those skilled in the art that numerous minor modifications of my invention may be made without significantly altering the scope of my invention.

Having described my invention, I claim:

1. A method of initiating and controlling the temperature of a carbonization reaction within a reaction zone wherein a dry particulate organic solid material is passed into said reaction zone and fluidized by an oxygen-containing gas and wherein said reaction zone is enclosed in indirect heat exchange relationship by a heat exchange zone containing a bed of fluidizable heat exchanges and particles comprising: fluidizing said bed of heat exchange particles with a hot fluid to thereby heat said reaction zone and initiate said reaction, and thereafter passing a cooling fluid through said bed of particles to thereby cool said reaction zone and maintain said reaction at a controlled temperature.

2. The process of claim 1, wherein said dried particulate solid material is passed into said reaction zone and fluidized by an oxygen-containing gas which is passed upwardly therethrough, gaseous effluent is continuously withdrawn from the upper region of said reaction zone, and carbonized solid product is continuously withdrawn from the lower region of said reaction zone.

3. The method of claim 2 wherein said carbonization reaction is heated by fluidizing said particles in said heat exchange zone with a hot combustion mixture sufficiently to initiate said carbonization reaction, and thereafter the temperature within said reaction zone is controlled by passing a cooling fluid through said heat exchange zone to maintain said carbonization reaction within said reaction zone at a temperature from about 600° F. to 2,000° F.

4. The method of claim 3 further comprising passing said gaseous effluent stream through a scrubber zone wherein said gaseous effluent stream is cooled and condensible chemicals are removed therefrom to yield a cooled product gas stream, and passing said cooled product gas stream to said carbonization zone to maintain fluidization velocity of materials therein.

5. The method of claim 4 wherein said carbonization process is carried out at a pressure below about 100 p.s.i.g.

6. A heat exchange apparatus for initiating and controlling the temperature of an exothermic reactor comprising:
   (a) annular heat exchanger means operatively positioned around said exothermic reaction in indirect heat exchange relationship;
   (b) a bed of fluidizable sand heat exchange particles positioned within said heat exchange means;
   (c) means to introduce a fluidizing heating fluid to the lower region of said bed;
   (d) means to introduce a cooling fluid to the lower region of said bed;
   (e) means to remove heating and cooling fluid from said heat exchange means from above said bed.

7. The apparatus of claim 6 wherein said means to remove heating and cooling fluid comprises a gas-solids separation device to separate any entrained solids from said fluid, and return said solids to said bed.

8. An apparatus for carbonizing organic materials comprising:
   (a) a fluidized carbonization retort;
   (b) means for introducing dried particulate organic feed to said retort;
   (c) first conduit means for removing a product gas stream from the upper region of said retort;
   (d) second conduit means for withdrawing carbonized solid product from the lower region of said retort;
   (e) fluidized heat exchanger means having sand therein enclosing said retort for supplying heat to initiate said carbonization reaction and for removing heat therefrom once the carbonization retort has reached carbonization temperature;
   (f) means for removing condensible hydrocarbons from said product gas stream operatively connected to said first conduit means.

9. The apparatus of claim 8 wherein said retort is equipped with baffle means to minimize back mixing therein.

10. The apparatus of claim 8 wherein said means for introducing dried particulate organic feed to said retore comprises a fluidized feed drier.

11. The apparatus of claim 8 further comprising a means for forming briquettes from said carbonized solid product operatively connected to said second conduit means.

12. The method of carbonizing dried, particulate organic solid material comprising:
   (a) passing said particulate material through a reaction zone and and fluidizing said material within said reaction zone with an oxygen-containing gas which is passed upwardly therethrough;
   (b) heating the resulting fluidized particles by passing a combustion mixture to an annular zone surrounding said reaction zone and containing sand heat exchange particles in a manner to fluidize said heat exchange particles and thereby cause initiation of the carbonization reaction within said reaction zone and thereby form vaporous condensible chemicals therein;
   (c) controlling the temperature of said carbonization reaction in said reaction zone to a temperature in the range of about 600° F. to 2000° F. by passing a cooling fluid through said annular zone after said initiation;

(d) continuously removing gaseous effluent containing said condensible chemicals from the upper region of said reaction zone and carbonized solid product from the lower region of said reaction zone; and (e) passing said gaseous effluent to a scrubber zone wherein said gaseous effluent stream is cooled and said condensible chemicals are removed therefrom.

13. The method of claim 12 further comprising passing the cooled gaseous effluent stream from said scrubber zone to said reaction zone to maintain fluidization velocity of materials therein.

References Cited

UNITED STATES PATENTS

| | | | |
|---|---|---|---|
| 2,751,756 | 6/1956 | Hughes et al. | 165—104X |
| 2,914,388 | 11/1959 | Kelley | 165—104X |
| 2,955,988 | 10/1960 | Sebastian | 201—29 |
| 3,075,580 | 1/1963 | Davis | 165—104 |
| 2,432,298 | 12/1947 | Eastwood et al. | 23—288.3S |
| 2,543,884 | 3/1951 | Weikart | 23—288.3S |
| 2,858,279 | 10/1958 | Drews | 23—288.3S |
| 3,051,629 | 8/1962 | Gorin et al. | |
| 3,236,607 | 2/1966 | Porter, Jr. et al. | 23—288.3S |
| 3,320,152 | 5/1967 | Nathan et al. | |

FOREIGN PATENTS

| | | |
|---|---|---|
| 871,000 | 6/1961 | Great Britain. |
| 564,679 | 1958 | Belgium. |

WILBUR L. BASCOMB, Jr., Primary Examiner

D. EDWARDS, Assistant Examiner

U.S. Cl. X.R.

201—29, 31, 37; 202—127, 121; 165—39, 104